(12) United States Patent
Dachepalli et al.

(10) Patent No.: US 10,373,134 B1
(45) Date of Patent: Aug. 6, 2019

(54) SCRUB AND MATCH AND PAYEE ACCOUNT MATCH

(71) Applicant: Wells Fargo Bank, N.A., San Francisco, CA (US)

(72) Inventors: Sabitha Dachepalli, Dublin, CA (US); Remo DeLeon, American Canyon, CA (US); Peter Rozovski, Concord, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 591 days.

(21) Appl. No.: 14/570,427

(22) Filed: Dec. 15, 2014

(51) Int. Cl.
| | | |
|---|---|---|
| *G06Q 20/36* | (2012.01) | |
| *G06Q 20/10* | (2012.01) | |
| *G06Q 20/04* | (2012.01) | |
| *G06F 16/245* | (2019.01) | |

(52) U.S. Cl.
CPC ......... *G06Q 20/108* (2013.01); *G06F 16/245* (2019.01); *G06Q 20/042* (2013.01)

(58) Field of Classification Search
CPC .............................. G06Q 20/12; G06Q 20/108
USPC .......................................................... 705/42
See application file for complete search history.

(56) References Cited

U.S. PATENT DOCUMENTS

| | | | |
|---|---|---|---|
| 6,363,362 B1 | 3/2002 | Burfield et al. | |
| 7,146,338 B2 | 12/2006 | Kight et al. | |
| 7,526,448 B2 | 4/2009 | Zielke et al. | |
| 7,844,546 B2 | 11/2010 | Fleishman et al. | |
| 8,566,237 B2 | 10/2013 | Forzley | |
| 8,660,950 B2 | 2/2014 | Mackouse | |
| 2003/0023552 A1 | 1/2003 | Kight et al. | |
| 2004/0049457 A1 | 3/2004 | Garrison et al. | |
| 2004/0088237 A1 | 5/2004 | Moenickheim et al. | |
| 2009/0076950 A1 | 3/2009 | Chang et al. | |
| 2012/0041881 A1* | 2/2012 | Basu ...................... | G06Q 20/02 705/67 |
| 2012/0259782 A1* | 10/2012 | Hammad ............... | G06Q 20/12 705/44 |
| 2012/0316992 A1 | 12/2012 | Oborne | |
| 2013/0018786 A1 | 1/2013 | Sher | |
| 2013/0066775 A1 | 3/2013 | Milam | |
| 2013/0311362 A1 | 11/2013 | Milam et al. | |

(Continued)

OTHER PUBLICATIONS

Recommendations for the Security of Internet Payments—EurIng N J (John) Karantzis & Scott W Minehane for Merchant Protect. Merchant Protect is a trading name of Indian Pacific Media Ltd, a company incorporated in the British Virgin Isles. (Year: 2012).*

(Continued)

*Primary Examiner* — Edward Chang
*Assistant Examiner* — Murali K Dega
(74) *Attorney, Agent, or Firm* — Foley & Lardner LLP

(57) ABSTRACT

Systems and methods for processing payment requests via a series of matching operations are described. Rules that compensate for incomplete or inaccurate information are applied to customer requests and stored merchant information to create identifiers, or "tokens." Tokens can be searched for, compared, and matched with confirmed merchant information, allowing for the identification of merchants known to financial institutions despite erroneous or missing information in the customer request.

24 Claims, 4 Drawing Sheets

FIG. 1

(56) References Cited

U.S. PATENT DOCUMENTS

| | | | |
|---|---|---|---|
| 2014/0032419 A1* | 1/2014 | Anderson | G06Q 20/12 |
| | | | 705/78 |
| 2015/0161596 A1* | 6/2015 | McCarthy | G06Q 20/02 |
| | | | 705/67 |
| 2016/0012422 A1* | 1/2016 | Chitilian | G06Q 20/3674 |
| | | | 705/67 |
| 2016/0098708 A1* | 4/2016 | Loomis | G06Q 20/367 |
| | | | 705/39 |

OTHER PUBLICATIONS

Web Fraud Prevention & Online Authentication Market Guide 2017-2018 (Year: 2017).*

Ajakaiye et al., "Online Based Authentication and Secure Payment Methods for M-Commerce Applications", Master of Science Thesis in the Programme Secure and Dependable computer systems, Jul. 2011, Chalmers University of Technology, University of Gothenburg, Goteborg, Sweden, 57 pages.

Devlin, Joseph, "The Changing Face of Billing", Transform Magazine, Jul. 2001, pp. 44-54, vol. 10, issue 7, ProQuest Technology Collection.

Sleeter, Doug, "Online Banking in QuickBooks", CPA Technology Advisor, Oct. 2005, pp. 44-45, vol. 15, issue 6; ProQuest Technology Collection.

* cited by examiner

SCRUB AND MATCH AND PAYEE ACCOUNT MATCH

FIELD

The present disclosure generally relates to online payment systems.

BACKGROUND

Many financial institutions have developed internet banking software applications for their customers. These software applications offer convenient ways for customers to perform increasingly complex banking transactions remotely, thereby lowering costs to financial institutions by reducing customer load on their brick and mortar banking facilities. Some internet banking software applications allow customers to remotely request the financial institution to prepare and issue payments from customer accounts to identified merchants. The financial institutions implement the payments to the merchants by sending a paper check, sending an electronic payment, or the like. When possible, the financial institutions prefer to make payments electronically due to the low cost compared to paper checks. However, for personal payments or payments to less established merchants, the financial institutions implement the payments via paper checks.

Generally, customers prepare payment requests by unilaterally entering payment request information, including merchant information and the customer's account number with that merchant, into a financial institution's software application. If a customer enters inaccurate merchant and/or account number information, and/or the software application does not recognize an established merchant from the customer's entered information, paper checks are issued by default.

Customers can also send merchant information and account number information to create a payee in a financial institution's software application. Creating a payee will subsequently allow the financial institution's software application to enable features such as e-bills and automatic payments with the created payee. However, if the customer enters inaccurate merchant and/or account number information while creating payees, and/or the software application does not recognize an established merchant from the customer's entered information, subsequent automatic payments and payments to e-bills will be made via paper checks by default. As such, the entry of correct merchant information and account number information is also important in the payee creation process.

SUMMARY

One embodiment of the invention relates to a financial institution computing system. The system includes a database, a user interface logic, a merchant matching logic, and a payment processing logic. The user interface logic is configured to access and exchange data over a network. The merchant matching logic is configured to maintain the database. The merchant matching logic is further configured to receive customer requests through the user interface logic. The merchant matching logic is configured to create customer tokens from the customer requests. The merchant matching logic is further configured to search the database for merchant tokens that match the customer tokens. The merchant matching logic is configured to instruct a payment processing logic to prepare and cause a paper check or an electronic payment to be issued. The payment processing logic is configured to prepare and cause a paper check to be issued. The payment processing logic is further configured to prepare and cause an electronic payment to be issued.

Another embodiment of the invention relates to a computer-implemented method. The method includes maintaining, by a merchant matching logic, a database comprising a plurality of profiles of merchant information associated with a plurality of merchants, including merchant names and remittance addresses, and a plurality of merchant tokens corresponding to the plurality of merchants in the database. The method further includes receiving, by a user interface logic, a customer request. The method includes creating, by a merchant matching logic, customer tokens based on the merchant information in the customer request. The method further includes compiling, by a merchant matching logic, merchant tokens that match the customer tokens. The method includes instructing, by a merchant matching logic, a payment processing logic to prepare and cause a paper check or an electronic payment to be issued. The method further includes preparing and issuing, by a payment processing logic, a paper check or an electronic payment.

Yet another embodiment of the invention relates to a non-transitory computer readable media having computer-executable instructions embodied therein that, when executed by a processor of a financial institution computing system, cause the financial institution computing system to perform operations to issue payments from customer accounts to identified merchants. The operations include maintaining a database comprising a plurality of profiles of merchant information associated with a plurality of merchants, including merchant names and remittance addresses, and a plurality of merchant tokens corresponding to the plurality of merchants in the database. The operations further include receiving customer requests through a user interface logic. The operations include creating customer tokens based on the merchant information in the customer request. The operations include compiling merchant tokens that match the customer token. The operations further include preparing and causing a paper or electronic payment to be issued.

DETAILED DESCRIPTION

Referring to the figures generally, systems and methods for processing customer payment requests to merchants or customer payee creation requests are described. The information contained in these customer requests include, but are not limited to, the customer's merchant information, the customer's account number with the merchant, and the customer's transaction-related information. Merchant information includes the merchant's name and the merchant's remittance address. A merchant's information and the customer's account number information for that merchant can be collected and organized as a "payee", and as such, payees can be created and stored. Transaction-related information includes, for example, the amount of currency to be transferred to the merchant and the timing of the transaction for a customer payment request. For payee creation requests, transaction-related information can include a nickname for the payee, for the customer's future reference.

The system applies data matching rules that allow financial institutions to assist customers in creating payees and creating payments requests, particularly if the customer provides inaccurate or incomplete information. Using these data matching rules, a financial institution computing system converts databases of confirmed merchant information (e.g., names, addresses, phone numbers, etc.) into merchant-specific identifiers, or merchant "tokens." After receiving merchant and account number information in a customer request, the financial institution computing system uses the data matching rules to convert the customer's merchant information into customer tokens. The financial institution computing system then attempts to find merchant tokens that match the customer tokens. If matching merchant tokens corresponding to a single merchant are found, the financial institution computing system can use the corresponding merchant's information in the database of confirmed merchant information to complete the customer's payment request or to create the customer's payee.

Figure 1:
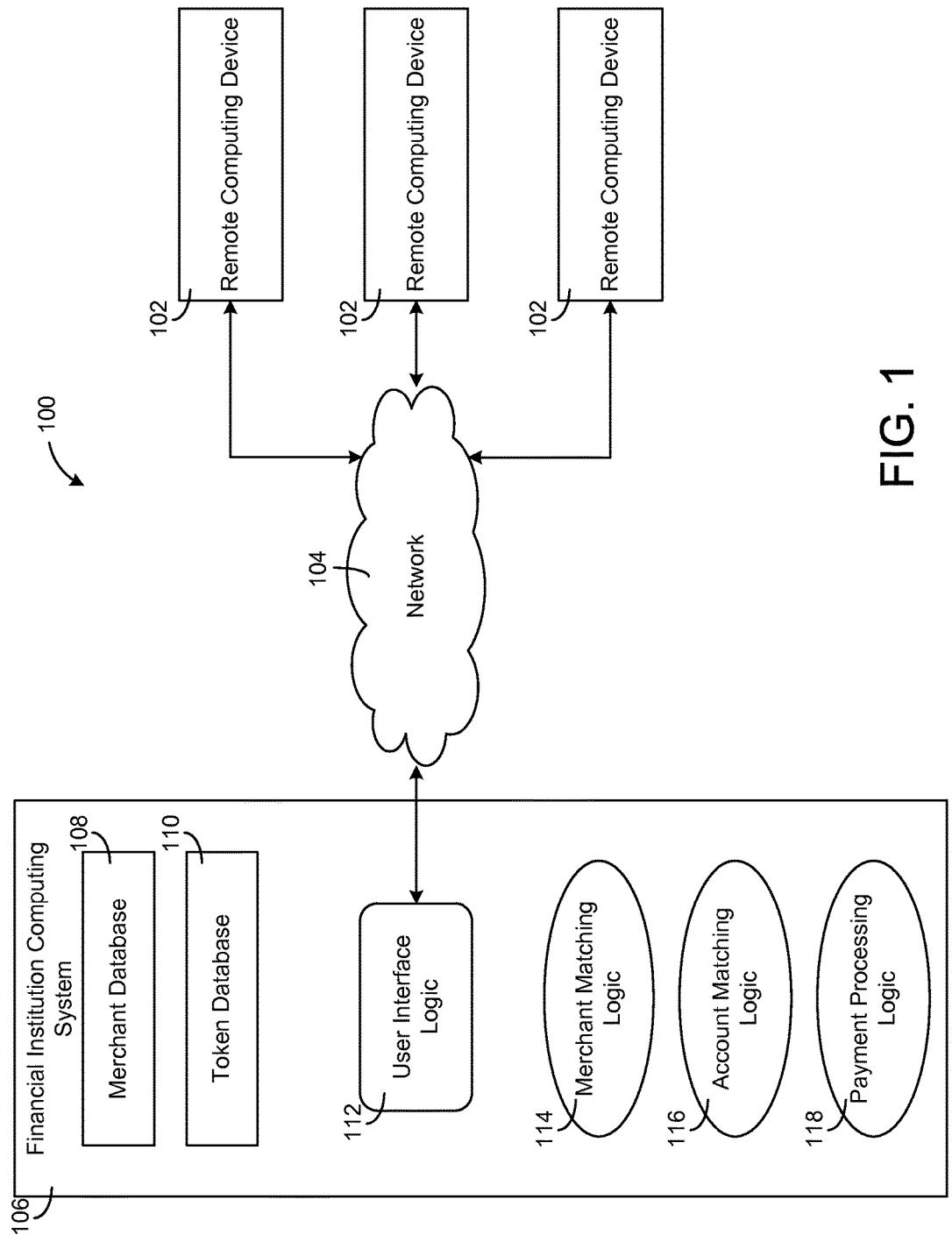
FIG. 1 is a schematic diagram of a computer-implemented customer request processing system according to an example embodiment.

Referring to FIG. 1, a schematic diagram of a computer-implemented customer request processing system 100 is shown according to an example embodiment. By using data matching rules, the processing system 100 corrects inaccuracies and compensates for missing information in customer requests (e.g., payment requests or payee creation requests) sent from remote computing devices 102 and received at a financial institution computing system 106 over a network 104. Customers may include business entities and/or individuals having one or more accounts with the financial institution. Financial institutions are banking entities capable of issuing payments from customer accounts, and may include commercial or private banks, credit unions, or investment brokerages. The relationships between the various aspects of system 100 are described in further detail below.

Still referring to FIG. 1, remote computing devices 102 refer to any of several personal, business, or mobile computing devices that a financial institution's customers may use to conduct banking transactions. Remote computing devices 102 may include, for example, desktop computers, laptop computers, virtual computing systems, smartphones, tablets, or PDAs. A common feature of remote computing devices 102 is the ability to access the network 104 in order to send and receive data to and from a financial institution computing system 106, including customer requests. The network 104 may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 104 includes the internet.

Still referring to FIG. 1, the system 100 includes the financial institution computing system 106. The financial institution computing system 106 facilitates payments from customer accounts to merchants. The financial institution computing system 106 includes a merchant database 108, a token database 110, a user interface logic 112, a merchant matching logic 114, an account matching logic 116, and a payment processing logic 118.

The user interface logic 112 allows the financial institution computing system 106 to exchange data with customer remote computing devices 102 over a network 104. When a customer sends a request to a financial institution, the user interface logic 112 in the financial institution computing system 106 receives the request from the network 104 and routes the request to the merchant matching logic 114.

The merchant matching logic 114 performs a scrub and match process. The scrub and match process is a two stage procedure where merchant information entered in a customer request sent via the remote computing device 102 is first scrubbed to resolve incomplete or inaccurate merchant information, and then matched with merchants from a database of merchant information. In performing the scrub and match process, the merchant matching logic 114 utilizes a merchant database 108 and token database 110.

The merchant database 108 contains profiles of information for a plurality of merchants, including, for example, each merchant's full name, aliases, previous names, phone numbers, remittance addresses, and the like. Each merchant profile also includes information as to how the corresponding merchant formats its customers' account numbers (e.g., that Merchant A's profile shows an account number format of a string of ten numbers; Merchant B's profile shows an account number format of a string of twelve numbers and letters, and so on). Multiple merchant profiles for a given merchant may exist in the merchant database 108. In some arrangements, customers can send a request to the financial institution computing system 106 to add a specific merchant to the merchant database 108 by providing said merchant's information sufficient to complete a merchant profile.

The merchant database 108 can be stored in the financial institution computing system 106 on any of several digital storage mediums such as disc-based or flash-based hard drives, local servers, offsite cloud-based servers, or a combination thereof. Although the merchant database 108 is represented as a single unit in FIG. 1, the merchant database can be divided and stored in several storage mediums of varying types and in different, even remote, locations.

The merchant matching logic 114 also uses a token database 110 during the scrub and match process. The token database 110 is a collection of merchant-specific identifiers, or "tokens" that are derived from merchant profiles in the merchant database 108. Each merchant token represents a merchant profile in the merchant database 108 and contains codes that correspond to pieces of information (e.g., name, address, phone number, etc.) in each merchant profile. In some arrangements, an individual merchant token associated with an individual merchant does not reflect each and every piece of information relating to the individual merchant from the merchant database 108. In such arrangements, the individual merchant token includes a portion of the information relating to the individual merchant that is sufficient to distinguish the token from other merchant tokens. The token database can be stored via any of the means of data storage described for the merchant database 108.

The merchant matching logic 114 applies merchant rules to the merchant profiles in the merchant database 108 to create the merchant tokens in the token database 110. Merchant rules are operations designed to compensate for potential inconsistencies, errors, or missing information that may result when a customer enters a desired merchant's information into a customer request by identifying classes of merchant information and performing correction and gap-filling operations on those classes of merchant information. For example, in the context of merchant names, merchant rules can include converting all letters into capital letters, and eliminating all spaces and special characters (e.g., periods, commas, ampersands, hashes, and dashes). The merchant rules can be further tailored to account for variance in the labeling of corporate entities, such as "Co." and "Company" or "Corporation" and "Corp." by identifying all such permutations and converting them into their respective abbreviations. Applying these rules on a profiled merchant name "A-B, C, & D Credit Company" would yield "ABCD-CREDITCO" as a merchant token. The merchant matching logic 114 will then store the ABCDCREDITCO token in the token database 110. The ABCDCREDITCO token can then be associated with all permutations of characters that could yield "ABCDCREDITCO" under this example set of merchant rules. In other words, regardless of whether a customer enters "A-B, C, & D Credit Co." or "a, b, c, and d credit company" or "ABCD Credit Co." into a request, running the example merchant rules on all of these permutations will also yield "ABCDCREDITCO" for each of the customer entries. Accordingly, applying the merchant rules to customer-entered merchant information allows for accurate retrieval of the proper merchant token from the token database 110.

In some arrangements, different sets of merchant rules are used to create different sets of tokens. For example, in the context of merchant rules for processing merchant addresses, one set of address rules can be number-based, and eliminate all letters, spaces, and special characters, and then insert an asterisk (*) to separate each set of remaining numbers (e.g., "123 Broadway St., Ste. 4, City, State, 56789" becomes "123*4*56789"). Another set of address rules can be letter-based, and eliminate all numbers, spaces, special characters, and dashes, then capitalize each remaining letter, and finally convert all permutations of street and unit terms into abbreviations (e.g., "123 Broadway Street, Suite 4, City, State, 56789" becomes "BROADWAYST-STECITYSTATE"). Each of these alternatives can be used to create and store tokens in the token database 110.

The merchant rules do not need to be divided into predetermined sets of rules. In some arrangements, the merchant rules are maintained as a collection of independent token-generating rules that can, for example, be or serially run one after another, or subdivided into rule groups of rules in real time, and then applied by the merchant matching logic 114. In some of these arrangements, the merchant matching logic 114 also sorts and assigns varying levels of priority in terms of the order in which merchant rules are run. The merchant matching logic 114 can add, supplement, or remove merchant rules. As such, the creation and application of merchant rules by the merchant matching logic 114 can change and evolve to increase the accuracy of the merchant matching process.

In some embodiments, the token database 110 is created once and then updated on an ongoing basis as merchants are added to (or removed from) the merchant database 108 as the merchant rules are updated, and so on. In other embodiments, new token databases may be generated more often, e.g., during real time operation of the system 100 when a customer request is received. Additionally, tokens in the token database 110 can be periodically discarded. For example, if a specific merchant token has not been used by a customer in a designated period of time, such as a year, the financial institution computing system 106 may remove the token from the token database 110.

At any time after the token database 110 is created, the merchant matching logic 114 can receive a customer request (e.g., a customer payment request, or a payee creation request). After the merchant matching logic 114 receives a customer request, the merchant matching logic 114 scrubs the request by applying merchant rules on the merchant information contained in the customer request to generate one or more customer tokens. The merchant matching logic 114 then searches the token database 110 in order to match merchant tokens with the customer token. The merchant matching logic 114 will continue running merchant rules on the customer request and matching merchant tokens until all of the merchant rules or combinations of merchant rules are exhausted, or until the merchant matching logic 114 has performed some number of rules and/or searches.

The scrub and match process concludes after the merchant matching logic 114 exhausts its searches of token database 110. If the scrub and match process produced at least one merchant token, the merchant matching logic will pull the underlying merchant profile(s) from the merchant database 108 and send the merchant profiles to the account matching logic 116 to begin the payee account match process. If the scrub and match process did not yield any matching merchant tokens, and the customer's request was a payment request, the merchant matching logic 114 will send the customer's payment request information, as entered by the customer, to the payment processing logic 118 to prepare and issue a paper check payment. If the customer's request was a payee creation request, the merchant matching logic 114 will store the payee in the financial institution computing system 106 as a payee involving a private merchant, and future payment requests based on the new payee may be completed via a paper check.

The financial institution computing system 106 includes an account matching logic 116. When the account matching logic 116 receives merchant profiles from the merchant matching logic 114, the account matching logic 116 begins the payee account matching process. If the scrub and match process resulted in a single merchant profile, the payee account matching process attempts to confirm that the resulting merchant is indeed the customer's intended merchant. If the scrub and match process resulted in more than one merchant profile, the payee account matching process attempts to isolate and confirm a single merchant from all of the resulting merchants. In either case, the account matching logic 116 performs the same set of operations discussed below.

After the account matching logic 116 receives merchant profiles from the scrub and match process, the account matching logic 116 begins the payee account matching process by accessing each merchant's account number format information from the merchant profiles. As different merchants often use different customer account number formats, each set of account number mask rules is potentially unique to each merchant in the merchant database 108. For example, Merchant A's account number format may be a string of ten numbers, separated by a dashes after the third and sixth numbers (e.g., "123-456-7890"). On the other hand, Merchant B's account number format may be a string of twelve numbers and letters, separated by spaces after the fourth and eighth characters (e.g., "12AB C3DE F456").

After the account matching logic 116 accesses the relevant account number formats from the merchant profiles, the account matching logic 116 compares the account number entered in the customer request with the account number formats for each of the merchants produced from the scrub and match process. If the account matching logic 116 finds that the account number entered in the customer request conforms with a single merchant's account number format, the account matching logic 116 will classify that merchant as a known merchant. As such, the payment processing logic 118 will be able to prepare and issue electronic payments to that known merchant (i.e., immediately, if the customer request was a customer payment request, or at some future date if the customer request was a payee creation request). If the account matching logic 116 finds that the account number conforms with the account number format of more than one merchant from the scrub and match process, or does not conform with the account number formats for any of the merchants from the scrub and match process, the account matching logic 116 will classify the merchant identified in the customer request as a private merchant, and the payment processing logic 118 can subsequently prepare and issue a paper check payments to that private merchant.

For example, assume that the scrub and match process produced merchant profiles for Merchant A and Merchant B for the payee account match process. Merchant A's profile contains the account number format information described for Merchant A above (i.e., a string of ten numbers, separated by a dashes after the third and sixth numbers (e.g., "123-456-7890")) and Merchant B's profile contains the account number format information described for Merchant B above (i.e., a string of twelve numbers and letters, separated by spaces after the fourth and eighth characters (e.g., "12AB C3DE F456")). If the customer entered "33LR 2UD4 ABS4" as the account number in the customer request, the account matching logic 116 will recognize that the account number only conforms with the account number format for Merchant B. Because the payee account match process produced a single matching merchant, the account matching logic 116 will classify the merchant in the customer request as a known merchant, and the payment processing logic 118 will be able to prepare and issue electronic payments to Merchant B.

Still referring to FIG. 1, the financial institution computing system 106 includes a payment processing logic 118. The payment processing logic 118 can use information from the merchant database 108, the merchant matching logic 114, the account matching logic 116, and the information in customer requests to issue payments to merchants.

The payment processing logic 118 receives customer payment requests to private merchants and known merchants sent by customers over the network 104 to the financial institution computing system 106. If the payment processing logic 118 receives a customer payment request to a private merchant as classified by the merchant matching logic 114 or the account matching logic 116, the payment processing logic 118 will issue a payment to the merchant identified in the customer's payment request via a paper check, using the information that the customer entered into the payment request or a previously stored payee. A paper check is a hard copy instrument entitling the named merchant to the payment of funds from the financial institution's customer account. As paper checks have to be drafted, printed, packaged, and physically sent through a carrier, issuing paper checks entails considerable costs to the issuing financial institution.

If the payment processing logic 118 receives a customer payment request to a known merchant as classified by the account matching logic 116, the payment processing logic will issue an electronic payment from the requesting customer's account using the known merchant's information from the merchant profile in the merchant database 108, the customer's payment request, and/or a previously stored payee. Electronic payments have the same effect as their paper check counterparts. Instead of being drafted, packaged, and shipped, however, the payment processing logic 118 can route an electronic payment through the user interface logic 112, which can send the electronic payment to the merchant over a network 104. As a result, electronic payments entail a substantial cost savings compared to paper checks.

Figure 2:
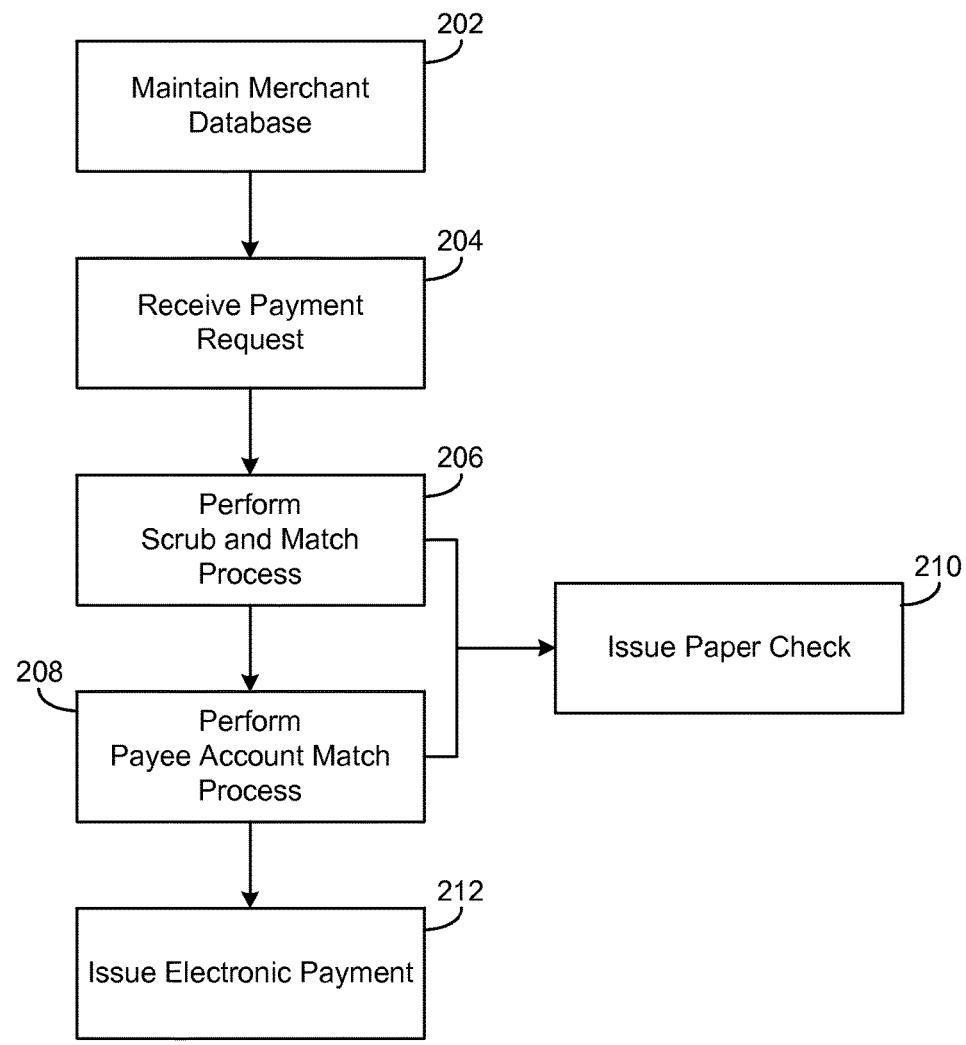
FIG. 2 is a flow diagram of a method of processing customer requests according to an example embodiment.

Referring to FIG. 2, a flow diagram of a method 200 of processing customer requests is shown according to an example embodiment. The method 200 is performed by a financial institution computing system (e.g., financial institution computing system 106), which provides a payment system that allows customers to identify merchants, create payees, and request the payment of funds to merchants from the customers' accounts at the financial institution. As discussed above with respect to system 100 and in further detail below with respect to method 200, the financial institution's computing system identifies customer-intended merchants despite missing or incorrect information entered into customer requests.

Method 200 begins when a merchant database is maintained (202). The financial institution computing system maintains a merchant database (e.g., merchant database 108) containing information profiles for a plurality of merchants. The merchant database includes various types of merchant information sufficient to identify and send payments to specific merchants on behalf of the financial institution's customers, which are organized in merchant profiles. The information in a given merchant profile includes any of the merchant's name, aliases, previous names, account number formats, phone numbers, addresses, financial information, and the like. The merchant database also include merchant tokens, which are described in further detail above with respect to FIG. 1, and below with respect to FIG. 3. As will be appreciated, in operation, the merchant database may be maintained on an ongoing basis as merchants are added to or removed from the system 100.

In operation, customer requests (e.g., payment requests or payee creation requests) are sent by the customers of a financial institution over a network (e.g., requests sent by the remote computing devices 102 over the network 104 as described above with respect to FIG. 1) and are received by the financial institution computing system (204). Included in a customer request is merchant information intended to identify the merchant, the customer's account number with that merchant, and transaction-related information (e.g., a specified amount of funds to be issued to the merchant from the customer's account at the financial institution for a payment request, or a nickname for a payee creation request).

After a customer request is received at 204, a scrub and match process is performed (206). A financial institution computing system (e.g., financial institution computing system 106) performs the scrub and match process. The scrub and match process involves information from the customer request received at 204 and the merchant database maintained at 202. By converting merchant information into merchant-specific identifiers, or "tokens", the scrub and match process attempts to correct errors and/or fill missing information in the customer request. The scrub and match process is described in further detail below with respect to FIG. 3.

Figure 3:
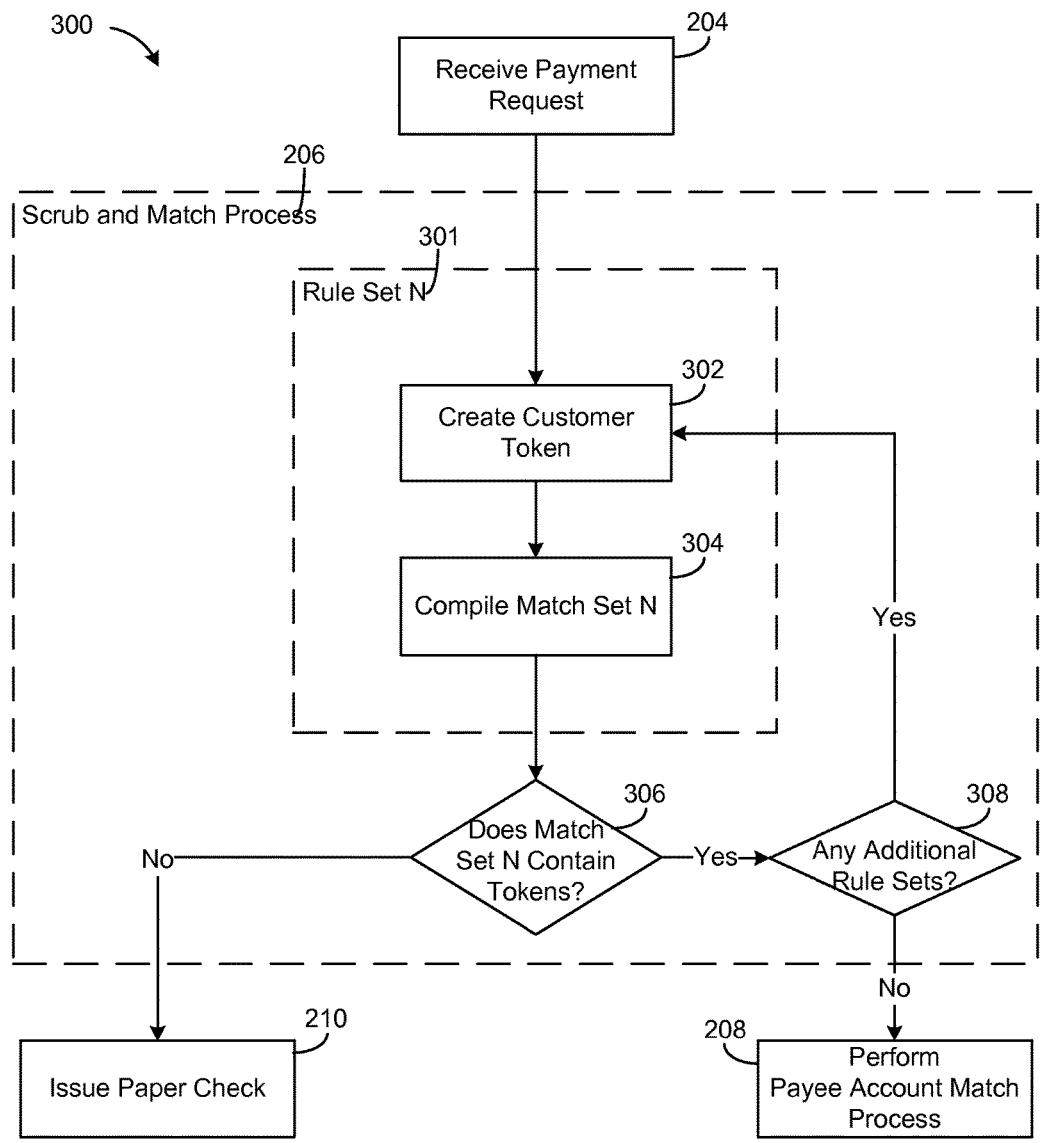
FIG. 3 is a flow diagram of a scrub and match process within the method of processing customer requests according to an example embodiment.

Referring to FIG. 3, a flow diagram of the scrub and match process at 206 is shown according to an example embodiment. The scrub and match process attempts to produce a set of potential merchants while accounting for potentially inaccurate or incomplete merchant information within the customer request. The scrub and match process begins when customer tokens are created (302). A customer token is a string of characters (e.g., letters, numbers, and/or special characters such as ampersands, hashes, and dashes). A customer token results from the financial institution computing system applying one of the rules in a Rule Set N of merchant rules (301) (e.g., the merchant rules applied by the merchant matching logic 114) to the information within the customer request.

The variable "N" in Rule Set N refers to a label for each set of rules (e.g., "Rule Set 1" for the first rule set applied, "Rule Set 2" for the second, and so forth). There can be any number of rule sets. For example, in one arrangement, there is only one rule set, which comprises all of the merchant rules in the financial institution computing system, and thus only a Rule Set 1. In another arrangement, there are multiple rule sets. In some arrangements, each rule set of the N number of rule sets is configured to operate on a different portion of the merchant information contained in the customer request (e.g., Rule Set 1 contains merchant rules for creating tokens from merchant names, Rule Set 2 contains merchant rules for numbers contained in a street address, Rule Set 3 contains rules for letters contained in a street address, Rule Set 4 contains alternative rules for addresses, etc.). These same rule sets were used to create the merchant tokens during the maintenance of the merchant database at 302.

After the customer token is created at 302, a Match Set N is compiled (304). The financial institution computing system creates Match Set N by collecting any merchant tokens in the merchant database that match the customer tokens. In some embodiments, a tolerance is provided such that slight variations between two tokens may nevertheless trigger a "match." The variable "N" here also refers to the corresponding set of rules applied to make the customer and merchant tokens (e.g., "Match Set 1" is created from "Rule Set 1").

After Match Set N is created at 304, a series of conditional operations are performed (306, 308). The first condition is met if there is at least one matching merchant token (306). If the condition at 306 is not met, the merchant identified in the customer request is classified as a private merchant. As such, if the customer request was a payee creation request, the merchant and the customer's account number with that merchant will be stored as a payee involving a private merchant. If the customer request was a payment request, a paper check payment will be prepared and issued (210) to that private merchant. A paper check is a hard copy instrument entitling the named merchant to the payment of funds from the financial institution's customer account. The paper check is prepared using the merchant's information as entered by the customer in a payment request, or as stored as a previously created payee.

If, on the other hand, the condition at 306 is met and Match Set N contains at least one token, the next condition is met if there are no additional rule sets to apply (310). Whether this condition is met will depend on how the financial institution computing system is configured. For example, the financial institution computing system can be configured to exhaust all existing rule sets, or to run some minimum number of rule sets, or to run rule sets until the Match Set is reduced to some maximum number of tokens. If the condition at 308 is met and there are no additional rule sets to be applied, Match Set N is sent to the payee account match process (208). If the condition at 310 is not met and there are additional rule sets, the last Match Set is sent back to the Create Customer Token step at 302 where the next Match Set (e.g., N+1) will be created by applying the next additional Rule Set (e.g., N+1) to create new customer tokens.

Figure 4:
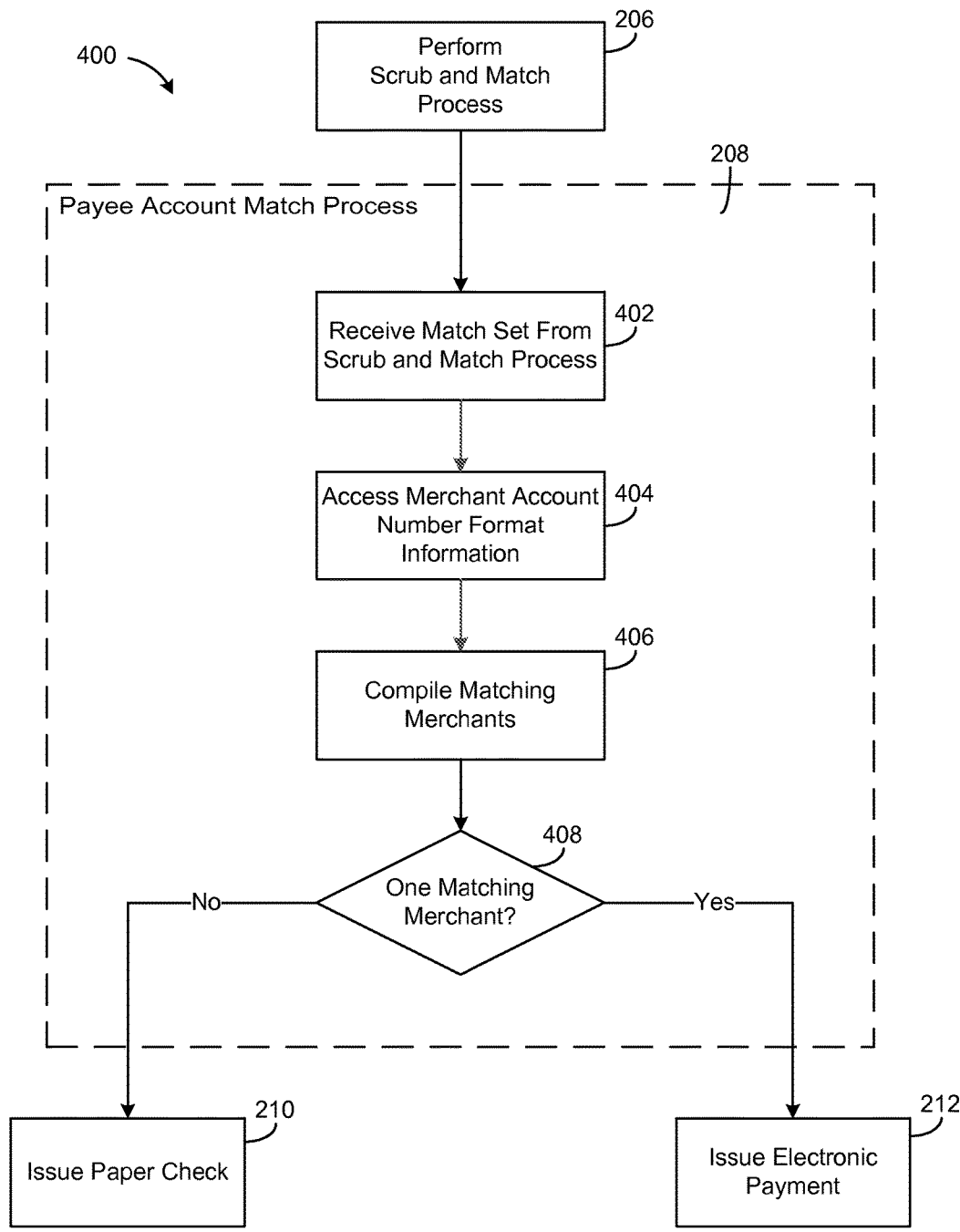
FIG. 4 is a flow diagram of a payee account match process within the method of processing customer requests according to an example embodiment.

Referring to FIG. 4, a flow diagram of the payee account match process at 208 is shown according to an exemplary embodiment. The payee account match process attempts to narrow down the match set produced in the scrub and match process to a single merchant. If the match set already consists of a single merchant, the payee account match process attempts to confirm that merchant as the customer's intended merchant. The payee account match process begins when a match set is received (402). The match set that is received is the end product of the scrub and match process at 206.

After the match set is received at 402, merchant account number format information is accessed (404). Different merchants often use different customer account number formats, varying by number and type of characters. While Merchant A may use ten-digit customer account numbers consisting of numbers and dashes only (e.g., "123-456-7890"), Merchant B may use a twelve character format with numbers, letters, and spaces (e.g. "12AB C3DE F456"). Merchant account number formats are therefore potentially unique to each merchant, and the account number format information accessed should correspond to each merchant in the match set received.

The merchant account number format information is stored in the financial institution computing system. The financial institution computing system can include a separate database of merchant account number format information for the merchants in the merchant database, or include the merchant account number format information in the merchant database itself.

After the merchant account number information is accessed at 404, matching merchants are compiled (406). The financial institution computing system compiles matching merchants by comparing the customer account number entered in the customer request with each match set merchant's account number format information. If the account number in the customer request conforms with a match set merchant's account number format, that merchant is a matching merchant.

For example, taking Merchant A and Merchant B described above, each merchant has their own respective set of account number formats. Merchant A has a ten-digit numerical account number format as described above (e.g., "123-456-7890"), and Merchant B's account number format has a twelve-digit string of both numbers and letters as also described above (e.g. "12AB C3DE F456"). If a customer entered the account number "12AB C3DE F456" in the customer request, it will conform with Merchant B's account number format, but not Merchant A's. As such, Merchant B will be compiled as a matching merchant, while Merchant A will not.

After the matching customer tokens are compiled at 406, the quantity of matching merchants is determined (408). If one matching merchant is compiled, the financial institution computing system will classify the merchant in the customer request as a known merchant, and the financial institution can subsequently prepare and issue electronic payments (212) to that merchant. If the customer request was a payee creation request, the financial institution will store the merchant and the customer's account number with that merchant as a new payee involving a known merchant. If the customer request was a payment request, the financial institution will prepare and issue an electronic payment to the known merchant.

In some embodiments, if more than one matching merchant or no matching merchants are compiled, the financial institution computing system will classify the merchant in the customer request as a private merchant, and the financial institution can subsequently prepare and issue paper checks (210) to the private merchant identified in the customer request, or store the information in the customer request as a new payee involving a private merchant. In other embodiments, in this situation, the customer may be presented with a list of potential matches and be prompted to select the correct merchant from the list. In other embodiments, a confidence score may be generated reflecting the confidence that each potential match is the correct merchant, and the user may be prompted to confirm that the potential match with the highest confidence score is the correct merchant or to select another match as the correct merchant. Other arrangements may also be utilized.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multiprocessor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A financial institution computing system for processing customer requests, the system comprising:
   a first processor;
   a second processor;
   a database comprising:

a plurality of profiles of merchant information associated with a plurality of merchants, including merchant names and remittance addresses, and a plurality of merchant tokens corresponding to the plurality of merchants in the database, the plurality of merchant tokens managed by one of a plurality of database entities comprising a first database entity configured to store merchant data and associated with the first processor and a second database entity configured to store merchant format mask rules and associated with the second processor;

a user interface logic comprising machine-executable instructions stored in non-volatile memory, the instructions, when executed by at least one of the first processor and the second processor, directing the computing system to access and exchange, via a remote computing device, data over a network;

a merchant matching logic comprising machine-executable instructions stored in non-volatile memory, the instructions, when executed by at least one of the first processor and the second processor, directing the computing system to:

receive from a remote computing device a plurality of customer requests through the user interface logic, create a plurality of customer tokens from at least one of the plurality of customer requests by applying one or more rules to the plurality of customer requests based on sets of rules, wherein the at least one of the plurality of customer requests is split into the plurality of customer tokens, and generate a match set N by, for each of the plurality of customer tokens, performing the following operations:

for each of the plurality of customer tokens, searching the first database entity, by executing a first set of instructions by the first processor, and the second database entity, by executing a second set of instructions by the second processor, wherein the first database entity is searched for merchant tokens that match at least one of the plurality of customer tokens based on at least one of the plurality of profiles of merchant information associated with the at least one of the plurality of customer requests, and wherein the second database entity is searched for merchant format mask rules matching a format of the one of the plurality of customer tokens;

for each of the plurality of customer tokens, collecting corresponding merchant tokens in the database that match the customer tokens;

transmitting at least one of the plurality of profiles of merchant information associated with the at least one of the plurality of customer requests to the remote computing device based on the match set N; and a payment processing logic comprising machine-executable instructions stored in non-volatile memory, the instructions, when executed by at least one of the first processor and the second processor, directing the computing system to prepare and cause a paper check or an electronic payment to be issued.

2. The system of claim 1, wherein the merchant matching logic is configured to create customer tokens based on the merchant name entered in a customer request from the plurality of customer requests.

3. The system of claim 1, wherein the merchant matching logic is configured to create customer tokens based on a merchant address entered in a customer request from the plurality of customer requests.

4. The system of claim 1, wherein the merchant matching logic is configured to create customer tokens based on numbers within the merchant information in a customer request from the plurality of customer requests.

5. The system of claim 1, wherein the merchant matching logic is configured to create customer tokens based on letters within the merchant information in a customer request from the plurality of customer requests.

6. The system of claim 1, wherein the merchant matching logic is further configured to apply the sets of rules to create the customer and merchant tokens until a number of matching merchant tokens is reduced to some maximum number of tokens.

7. The system of claim 1:

wherein the first database entity further includes payees, each payee comprising merchant information for one merchant and a customer's account number with that merchant; the system comprising an account matching logic, the account matching logic comprising machine-executable instructions stored in non-volatile memory, the instructions, when executed by at least one of the first processor and the second processor, directing the computer system to store new payees in the first database entity.

8. A computer implemented method of processing customer requests, the method comprising:

maintaining, by a merchant matching logic communicatively coupled to a processing system comprising a first processor and a second processor, a database comprising:

a plurality of profiles of merchant information associated with a plurality of merchants, including merchant names and remittance addresses, and a plurality of merchant tokens corresponding to the plurality of merchants in the database, the plurality of merchant tokens managed by one of a plurality of database entities comprising a first database entity configured to store merchant data and associated with the first processor and a second database entity configured to store merchant format mask rules and associated with the second processor;

receiving, by a remote computing device comprising a user interface logic, a customer request;

creating, by the merchant matching logic, a plurality of customer tokens based on the merchant information in the customer request by applying one or more rules to the customer request according to sets of rules wherein the customer request is split into the plurality of customer tokens;

generating, by the merchant matching logic, a match set N comprising merchant tokens that match the customer tokens by:

for each of the plurality of customer tokens, searching the first database entity, by executing a first set of instructions by the first processor, and the second database entity, by executing a second set of instructions by the second processor, wherein the first database entity is searched for merchant tokens that match at least one of the plurality of customer tokens based on at least one of the plurality of profiles of merchant information associated with the customer request, and wherein the second database entity is searched for merchant format mask rules matching a format of the one of the plurality of customer tokens;

for each of the plurality of customer tokens, collecting merchant tokens in the database that match the customer tokens; and transmitting at least one of the plurality of profiles of merchant information associated with the customer request to the remote computing device based on the merchant tokens collected;

instructing, by the merchant matching logic, a payment processing logic to issue a paper check or an electronic payment; and preparing and causing, by the payment processing logic, the paper check or the electronic payment to be issued.

9. The method of claim 8, wherein the merchant matching logic creates customer tokens based on the merchant name entered in the customer request.

10. The method of claim 8, wherein the merchant matching logic creates customer tokens based on a merchant address entered in the customer request.

11. The method of claim 8, wherein the merchant matching logic creates customer tokens based on numbers within the merchant information in the customer request.

12. The method of claim 8, wherein the merchant matching logic creates customer tokens based on letters within the merchant information in the customer request.

13. The method of claim 8, further comprising applying, by the merchant matching logic, the sets of rules in creating the customer and merchant tokens until a number of matching merchant tokens is reduced to some maximum number of tokens.

14. The method of claim 8, further comprising:

maintaining, by an account matching logic, the database to include payees, each payee comprising merchant information for one merchant, and a customer's account number with that merchant; and adding, by the account matching logic, a new payee to the database using information in the customer request.

15. A non-transitory computer readable media having computer-executable instructions embodied therein that, when executed by at least one processor of a financial institution computing system, cause the financial institution computing system to perform operations to issue payments from customer accounts to identified merchants, the operations comprising:

maintain a database comprising:
  a plurality of profiles of merchant information associated with a plurality of merchants, including merchant names and remittance addresses, and
  a plurality of merchant tokens corresponding to the plurality of merchants in the database, the plurality of merchant tokens managed by one of a plurality of database entities comprising a first database entity configured to store merchant data and associated with a first processor and a second database entity configured to store merchant format mask rules and associated with a second processor;

receive, via a remote computing device, a customer requests through a user interface logic;

create customer tokens based on the merchant information in the customer request for each of a plurality of customer tokens, comprising searching the first database entity, by executing a first set of instructions by the first processor, and the second database entity, by executing a second set of instructions by the second processor, wherein the first database entity is searched for merchant tokens that match at least one of the plurality of customer tokens based on at least one of the plurality of profiles of merchant information associated with the customer request, and wherein the second database entity is searched for merchant format mask rules matching a format of the one of the plurality of customer tokens, thereby reducing a match set by eliminating non-matching merchants;

for each of the plurality of customer tokens, collect merchant tokens in the database that match the customer tokens;

transmit at least one of the plurality of profiles of merchant information associated with the customer request to the remote computing device based on the merchant tokens; and prepare and cause a paper or electronic payment to be issued.

16. The media of claim 15, wherein customer tokens are created based on the merchant name entered in the customer request.

17. The media of claim 15, wherein customer tokens are created based on the merchant address entered in the customer request.

18. The media of claim 15, wherein customer tokens are created based on numbers within the merchant information in the customer request.

19. The media of claim 15, wherein customer tokens are created based on letters within the merchant information in the customer request.

20. The media of claim 15, wherein sets of rules are used to create the customer and merchant tokens until a number of matching merchant tokens is reduced to some maximum number of tokens.

21. The media of claim 15, wherein the operations further comprise:

maintain the database further including payees, each payee comprising merchant information for one merchant and a customer's account number with that merchant; and add a new payee to the database using information in the customer request.

22. The method of claim 1, wherein at least one of the plurality of merchant tokens corresponds to a merchant name.

23. The method of claim 1, wherein at least one of the plurality of merchant tokens corresponds to a street address.

24. The system of claim 1, wherein, for each of the plurality of customer tokens, the first database entity and the second database entity are searched concurrently.

* * * * *